(12) United States Patent
Gavagni et al.

(10) Patent No.: US 7,706,521 B2
(45) Date of Patent: Apr. 27, 2010

(54) STANDARDS BASED AGENT DESKTOP FOR USE WITH AN OPEN CONTACT CENTER SOLUTION

(75) Inventors: Brett J. Gavagni, Coconut Creek, FL (US); Baiju D. Mandalia, Boca Raton, FL (US); Victor S. Moore, Lake City, FL (US); Wendi L. Nusbickel, Boca Raton, FL (US)

(73) Assignee: International Business Machines Corproation, Armonk, NY (US)

( * ) Notice: Subject to any disclaimer, the term of this patent is extended or adjusted under 35 U.S.C. 154(b) by 284 days.

(21) Appl. No.: 11/684,397

(22) Filed: Mar. 9, 2007

(65) Prior Publication Data

US 2008/0205626 A1    Aug. 28, 2008

Related U.S. Application Data

(63) Continuation-in-part of application No. 11/680,304, filed on Feb. 28, 2007.

(51) Int. Cl.
*H04M 3/00* (2006.01)
*H04M 5/00* (2006.01)

(52) U.S. Cl. .................. 379/265.09; 379/266.01; 370/352; 709/219; 709/223

(58) Field of Classification Search ............ 379/265.09, 379/266.01; 370/352; 709/219, 223
See application file for complete search history.

(56) References Cited

U.S. PATENT DOCUMENTS

| | | | |
|---|---|---|---|
| 6,587,558 | B2 | 7/2003 | Lo et al. |
| 6,704,396 | B2 | 3/2004 | Parolkar et al. |
| 6,898,277 | B1 | 5/2005 | Meteer et al. |
| 6,922,466 | B1 | 7/2005 | Peterson et al. |
| 6,970,554 | B1 | 11/2005 | Peterson et al. |
| 6,972,761 | B1 | 12/2005 | Cox et al. |
| 6,978,247 | B1 | 12/2005 | Bogart et al. |

(Continued)

FOREIGN PATENT DOCUMENTS

EP    1237349 A2    9/2002

(Continued)

OTHER PUBLICATIONS

Kimbrough, S.O., et al., "On Automated Message Processing in Electronic Commerce and Work Support Systems: Speech Act Theory and Expressive Felicity", ACM Transactions on Information Systems, vol. 15, No. 4, pp. 321-367, Oct. 1997.

(Continued)

*Primary Examiner*—Quynh H Nguyen
(74) *Attorney, Agent, or Firm*—Patents on Demand, P.A.; Brian K. Buchheit

(57) ABSTRACT

The present invention discloses a contact center system based upon open standards. The contact center system can include at least one agent node, a portal server, and an application server. An agent node can include a standard HTTP browser that communicates over a standard Internet Protocol network using standard protocols. The portal server can be configured to communicate with an agent node via an agent portal, which can consist of multiple agent portlets to present information. The application server can be configured to execute contact center applications that can collect and distribute information via the agent portlets and transfer calls to agents.

18 Claims, 3 Drawing Sheets

U.S. PATENT DOCUMENTS

| | | | |
|---|---|---|---|
| 6,988,126 | B2 | 1/2006 | Wilcock et al. |
| 6,996,605 | B2 | 2/2006 | Low et al. |
| 7,003,079 | B1 | 2/2006 | McCarthy et al. |
| 7,085,728 | B2 | 8/2006 | Sarlay et al. |
| 7,315,616 | B2 * | 1/2008 | Annadata et al. ....... 379/266.01 |
| 2002/0055967 | A1 | 5/2002 | Coussement |
| 2002/0056000 | A1 | 5/2002 | Coussement |
| 2005/0047579 | A1 * | 3/2005 | Salame .................. 379/265.09 |
| 2006/0023864 | A1 | 2/2006 | Krahn |
| 2006/0031077 | A1 * | 2/2006 | Dalton et al. ................... 705/1 |
| 2007/0026852 | A1 * | 2/2007 | Logan et al. ............. 455/422.1 |
| 2007/0266075 | A1 | 11/2007 | Jachner |
| 2008/0003964 | A1 | 1/2008 | Alperin et al. |
| 2008/0192908 | A1 * | 8/2008 | O'Keefe et al. .......... 379/93.17 |

FOREIGN PATENT DOCUMENTS

EP    1484903 A2    12/2004

OTHER PUBLICATIONS

Brabrand, C., et al., "The <bigwig> Project", ACM Transactions on Internet Technology, vol. 2, No. 2, pp. 79-114, May 2002.

Fielding, R.T., et al., "Principled Design of the Modern Web Architecture", ACM Transactions on Internet Technology, vol. 2, No. 2, pp. 115-150, May 2002.

Meng, H., et al., "ISIS: An Adaptive, Trilingual Conversational System With Interleaving Interaction and Delegation Dialogs", ACM Transactions on Computer Human Interaction, vol. 11, No. 3, pp. 268-299, Sep. 2004.

Atkins, D., et al., "Common Presence and Instant Messaging: Message Format," [online] Internet Engineering Task Force, IETF, CH, vol. IMPP, No. 8, Jan. 9, 2003, [retrieved on Feb. 7, 2008] retrieved from the internet: <http://tools.ietf.org/html/draft-ietf-impp-cpim-msgfmt-08>.

Peterson, J., "Common Profile for Presence (CPP)," [online] Internet Engineering Task Force, IETF, CH, vol. IMPP, No. 4, Aug. 14, 2003, [retrieved on Feb. 7, 2008] retreived from the Internet: <http://tools.ietf.org/html/draft-ietf-impp-pres-04>.

Sugano, H., et al., "Prsence Information Data Format (PIDF)," [online] Internet Engineering Task Force, IETF, CH, vol. IMPP, No. 8, May 1, 2003, [retrieved on Feb. 7, 2008] retrieved from the Internet: <http://tools.ietf.org/html/draft-ietf-impp-cpim-pidf-08>.

Schulzrinne, H., et al., "RPID: Rich Presence Extensions to the Presence Information Data Format (PIDF)," [online] Internet Engineering Task Force, IETF, CH, July 1, 2006, [retrieved on Feb. 7, 2008] retrieved from the Internet: <http://www.ietf.org/rfc/rfc4480.txt>.

* cited by examiner

STANDARDS BASED AGENT DESKTOP FOR USE WITH AN OPEN CONTACT CENTER SOLUTION

PRIOR APPLICATIONS

This continuation-in-part application claims the benefit of U.S. patent application Ser. No. 11/680,304 filed 28 Feb. 2007, which is hereby incorporated by reference herein.

BACKGROUND

1. Field of the Invention

The present invention relates to the filed of contact center technologies and, more particularly, providing a computer telephone interface (CTI) whose operation is based upon open standards architecture.

2. Description of the Related Art

Conventional implementations of contact center architectures are based upon proprietary protocols, hardware, and software. Such implementations typically create environments where components from different vendors are incompatible with one another, locking a contact center into a single vendor system. As such, these systems are often unable to integrate new technologies for handling voice and data, such as Voice over Internet Protocol (VoIP) and IP Multimedia Subsystems (IMS), without substantial cost.

FIG. 1 (PRIOR ART) illustrates how a conventional contact center system 100 handles telephony and data communications. It is important to note that communications made between the components of system 100 use proprietary links, except where notes. As in a typical telephony system, the public branch exchange (PBX) 105 relays an incoming call to the interactive voice response (IVR) system 110 using a generic communications link, such as a T1 connection.

The IVR 110 can consult the computer telephone integration (CTI) server 120 and then can direct the call, using the Hyper Text Transfer Protocol (HTTP), to an appropriate voice application 115. The voice application 115 can receive user data from the caller, which the IVR 110 transfers to information server (IServer) 124. The user data can be stored in a data store 126 associated with the CTI server 120.

A transfer request from IVR 110 to a contact center agent can be sent to the transaction server (TServer) 122. Upon receiving the request, the TServer 122 can consult the IServer 124 and workflow manager 130 to determine agent availability. Once an agent is selected to handle the call, the workflow manager 130 can request that the TServer 122 transfer the call to the designated agent 135.

When the call is transferred to the agent 135, the agent desktop 140 can request the inputted user data from the IServer 124. Upon receipt of the user data, the agent desktop 140 can present contact center data to the agent 135. The agent using the desktop 140 can communicate with the caller and/or call center using voice and data modalities, both of which typically use proprietary hardware, software, and communication protocols, which are specific to a vendor providing the contact center solution 100. Often, the voice and data communication channels used by an agent are conveyed through two different physical lines, which are attached at the backend to different proprietary contact center hardware.

In a related application (U.S. patent application Ser. No. 11/680,304 entitled "IMPLEMENTING A CONTACT CENTER USING OPEN STANDARDS AND NON-PROPRIETARY COMPONENTS"), applicants have disclosed an open contact center, which describes a technique for implementing a contact center based upon open standards, which are independent upon any specific vendor. An open contact center permits interactions to occur using standard hardware and software devices. For example, an agent can interact with contact center components using standard telecommunication devices, such as a SIP based phone and/or a Web browser. Additionally, an open contact center can be expanded to benefit from new communication media. That is, the open contact center environment can allow contact center agents to interact with customers in a textual environment, a video conference environment, a co-browsing environment, in addition to a conventional voice environment. Additionally, the open contact center can utilize the latest trends in telephony services, such as VoIP and IMS.

SUMMARY OF THE INVENTION

The present invention discloses a contact center agent desktop which consists of a standard Web browser and a SIP based phone. The agent desktop can communicate with an open contact center. The open contact center can consist entirely of open standardized components and/or include an amalgamation of open standardized components and proprietary components. The open standardized components can be service oriented architecture (SOA) components. The open standardized components can also include IP Multimedia Subsystem (IMS) composite services model components. In the invention, a presence server and a set of associated watchers can be used to determine agent availability. In one embodiment, call transfers to the agent desktop can be performed using Voice eXtensible Markup Language (VXML) applications, such as by using the standard VXML <transfer> element.

The present invention can be implemented in accordance with numerous aspects consistent with the material presented herein. For example, one aspect of the present invention can include a contact center system based upon open standards. The contact center system can include at least one agent node, a portal server, and an application server. An agent node can include a standard Web browser that communicates over a standard Internet Protocol network using standard protocols. The portal server can be configured to communicate with an agent node via an agent portal, which can consist of multiple agent portlets to present information. The application server can be configured to execute contact center applications that can collect and distribute information via the agent portlets and transfer calls to agents. Although use of a portal and a set of agent portlets is one contemplated embodiment, the invention is not so limited. In one configuration, a contact center Web server, which is not a portal server, can serve dynamic Web pages configured for a contact center agent to each agent node.

Another aspect of the present invention can include a method for transferring a contact center communication to a contact center agent. The method can begin when a contact center agent logs onto a contact center system from a standard Web browser. A presence server can then accept presence information from the contact center agent. The contact center system can determined that a caller is to be transferred to an agent. An available agent can be found by querying the presence server and the caller transferred to the available agent.

Still another aspect of the present invention can include a contact center agent interface. The interface can include a standard Web browser in which an agent portal is presented. The agent portal can include multiple agent portlets that display contact center information. The multiple agent portlets can include a session portal and a caller portal. The session portal can be configured to present session-specific information about a communication session between a contact center agent and a caller transferred to the agent by the contact center system. The caller portal can be configured to present caller-specific information from the contact center system to the contact center agent in real-time. Further, the caller can be prohibited from viewing a portion of the information communicated between the contact center system and the agent.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
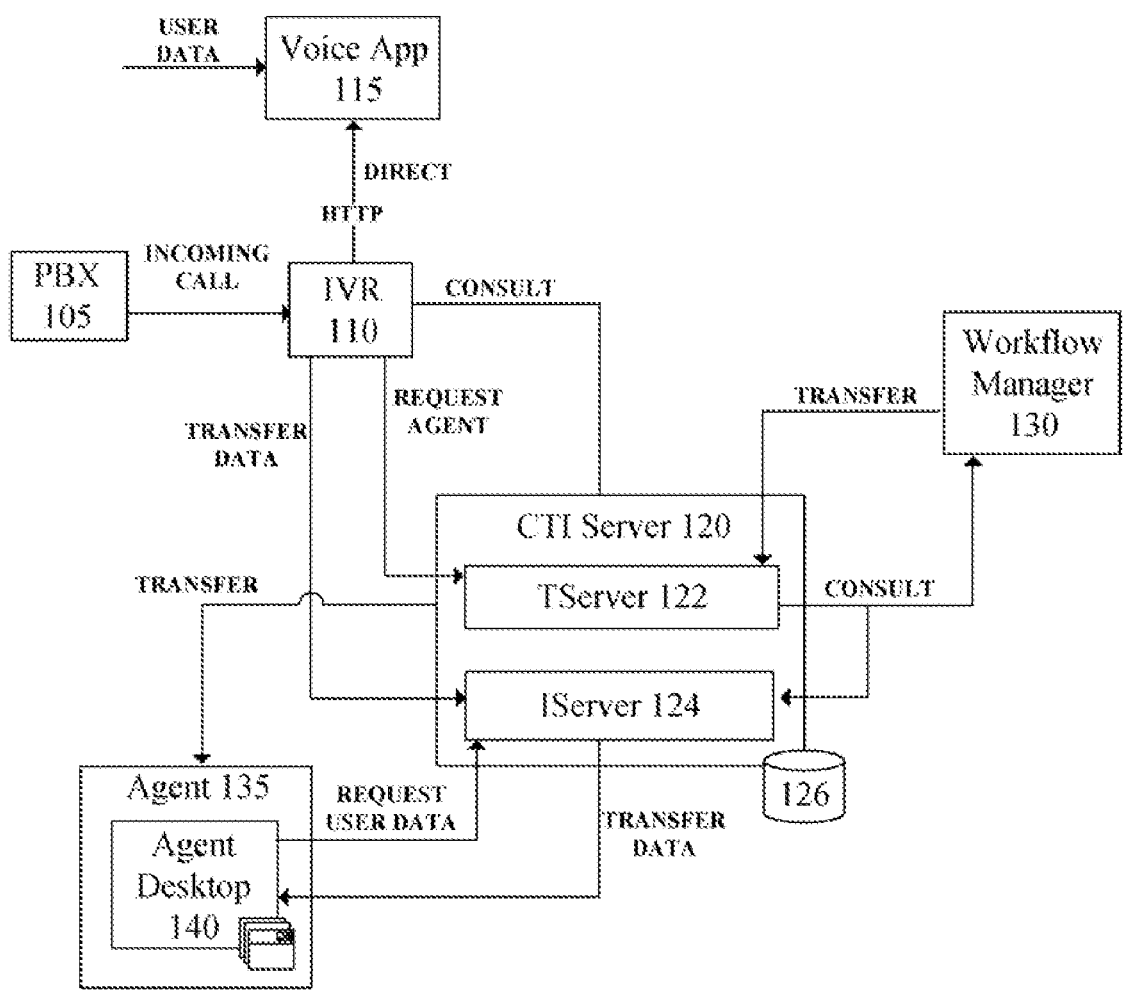
FIG. 1 (PRIOR ART) illustrates how a conventional contact center system handles telephony and data communications.
Figure 2:
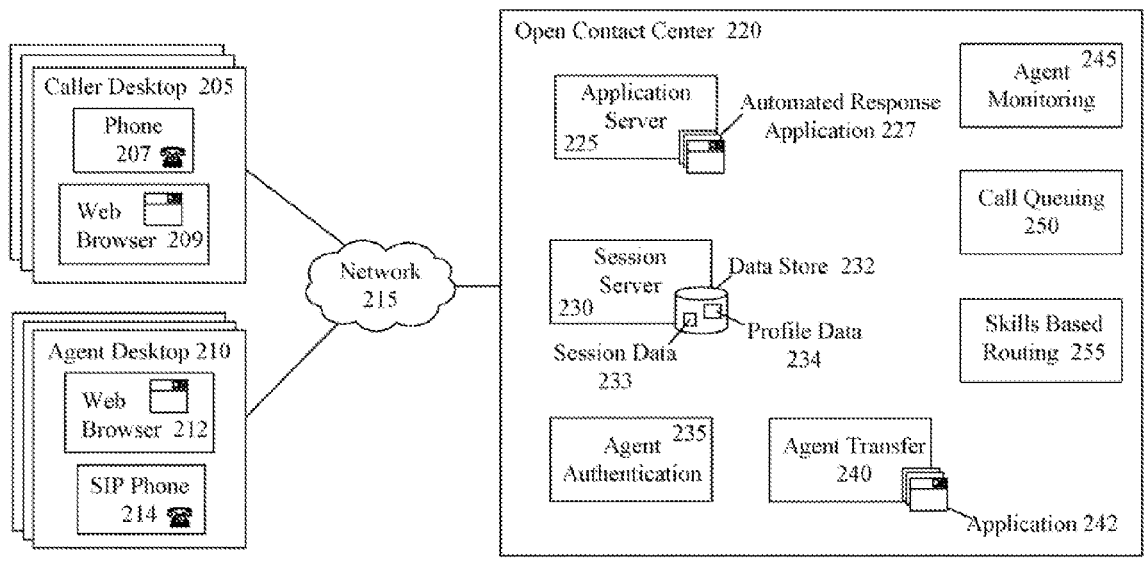
FIG. 2 is a schematic diagram of a system in which an open contact center utilizes components based on open standards to handle essential communication functions in accordance with an embodiment of the inventive arrangements disclosed herein.

FIG. 2 is a schematic diagram of a system 200 in which an open contact center 200 utilizes components based on open standards to handle essential communication functions in accordance with an embodiment of the inventive arrangements disclosed herein. Use of open standards indicates that specifics of communication protocols, interfaces with components of the open contact center, and the like are published and available to third party vendors, who can construct solutions or enhancements to the open contact center by conforming to the published standards. Open standards can include, but are not limited to, Extensible Markup Language (XML) based standards, service-oriented architecture (SOA) based standards, Real-time Transport Protocol (RTP) based standards, Media Resource Control Protocol (MRCP) based standards, Hyper Text Transfer Protocol (HTTP) based standards, Session Initiation Protocol (SIP) based standards, and the like. Open standards are often established by an independent standard setting body, such as the Internet Engineering Task Force (IETF), World Wide Web Consortium (W3C), and the like, or by a cooperating consortium of multiple independent businesses, such as IBM, Sun Microsystems, and the like. Open standards, as used herein, can exist even though one or more companies maintains intellectual property rights to open contact center concepts, such as those presented in the instant application.

An open contact center 220 can be a functional area used by one or more organizations to handle inbound/outbound communications between caller 205 and agent desktops 210. These inbound/outbound communications can be conveyed over a standard Internet Protocol (IP) based network and/or over a telephone network (e.g., Public Switched Telephone Network or mobile telephone network), which are collectively shown by network 215.

The caller desktop 205 can send/receive communications via a commercially available phone 207 and/or a standard Web browser 209. For example, a caller can call the open contact center 220 using a phone or can communicate in real-time using browser 209 and a test exchange modality. Similarly, the agent desktop 210 can include a standard Web browser 212 and a Session Initiation Protocol (SIP) phone 214. The use of a SIP phone 214 can allow the open contact center 220 and the agent desktop 210 to utilize VoIP technology. Further, the agent desktop 210 can include a circuit based phone (e.g., a standard phone) and network 215 elements can dynamically convert input/output of the phone to SIP compliant input/output. For example, the network 215 can include a component that functions as a proxy (not shown) having IP addresses, where the contact center 220 treats the proxy as a SIP based phone used by the agent, and where the proxy dynamically converts voice content between a circuit-committed protocol and an IP based protocol.

It should be appreciated that an agent can access the agent desktop 210 from any personal computer in an operations center and is not constrained to a particular station. The agent can also remotely (i.e., external to an operations center, such as though a home computer) connect to the components of the open contact center using a Web browser 212 and SIP based telephone 214.

The components 225-255 of the open contact center 220 can communicate with each other in order to collectively perform functions that are typically associated with the computer telephony integration (CTI) server of a conventional system, such as the CTI server 120 of system 100. An open contact center 220 can include components such as an application server 225, a session server 230, an agent authentication component 235, an agent transfer component 240, an agent monitoring component 245, a call queuing component 250, and a skills based routing component 255.

Application server 225 can be a server that utilizes modular components of a standardized runtime platform. The application server 225 can represent a middleware server of a multi-tier environment. The application server 225 can execute an automated response application 227.

The automated response application 227 can be a software program that handles incoming communications. Additionally, the automated response application 227 can interact with a caller to route the call and/or collect specific information. For example, the automated response application 227 can present the caller with a list of options that can allow the caller to select a functional group to route the call. Further, the automated response application 227 can be responsible for initiating a call session and routing the call to the appropriate component, such as the agent transfer component 240 or call queuing component 250.

The session server 230 can represent a component that captures, stores, and disseminates information regarding communication sessions handled by the open contact center 220 between caller 205 and agent 210 desktops. The session server 230 can utilize a data store 232 to store session 233 and profile 234 data. Session data 233 can include data items such as the time the call was received, the amount of time taken to resolve the call, the time the call ended, the resolution to the caller's issue, and the like. Profile data 234 can include data items such as the caller's name, the caller's address, the caller's account number, and any other information that can be pertinent for an agent to use when remedying the caller's issue.

The agent authentication component 235 can identify an agent and upon successful authentication can provide the agent with access to contact center 220 resources. For instance, an agent can login using a user id and password, which is submitted to the contact center using a Web interface. In one embodiment, the authentication function can be provided by WEBSPHERE Application Server (WAS) and Portal Server (PS) JAVA security facilities The agent transfer component 240 can transfer a communication from the automated response application 227 to an agent desktop 210. The functions of the agent transfer component 240 can require the use of an additional application 242 and can be implemented using a SIP Proxy, an agent transfer servlet, a Model Server (MS), a WEBSPHERE PS, and a "Get Agent" composite service. For example, a Voice XML (VXML) markup document (not shown) can use a VXML <transfer> tag to transfer a call back to the application server 225 and then onto the designated agent desktop 210.

The agent monitoring component 245 can permit call center agents to be monitored for quality assurance or training from virtually any location. In one embodiment, the agent monitoring component 245 can be provided using the WEBSPHERE Portal Server (WPS) and a reporting component (not shown). For example, agent interactions can be viewed/analyzed using the reporting component for items such as average call handling time, number of calls handled per hours, etc. One of the supervisor's portlets in their Web browser can contain a view of the call center agents, along with access to the agent reporting database, which can include agent specific statistics. In one embodiment, real-time statistics can be provided by the agent monitoring component 245, which can even permit the supervisor to silently conference into/observe a real-time agent/caller interaction. This conferencing may require use of additional functions of contact center 220.

The call queuing component 250 can queue incoming calls utilizing a customizable queuing algorithm. Calls can be placed in queues based on a variety of factors, such as required skills, caller importance, geographic location, a combination of factors, and the like. When agent skills are used for the purposes of routing calls, the skills based routing component 255 can determine agents to whom communications can be routed to. For example, the routing component 255 can route a call requesting word processing assistance to an agent who has "work processing" listed as a skill.

Figure 3:
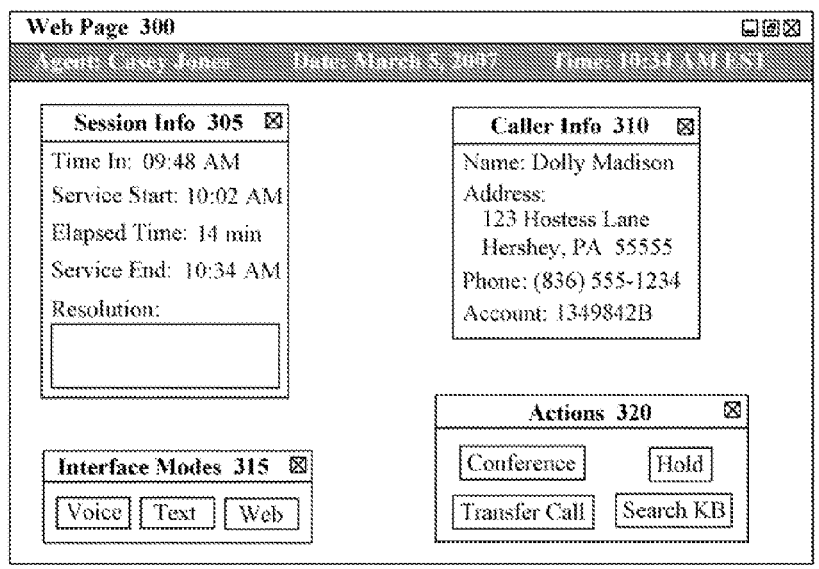
FIG. 3 is a Web page illustrating an agent interface for use with an open contact center in accordance with an embodiment of the inventive arrangements disclosed herein.

FIG. 3 is a Web page 300 illustrating an agent interface for use with an open contact center in accordance with an embodiment of the inventive arrangements disclosed herein. Web page 300 can be used within the context of system 200 or any other system that supports an architecture based on open standards.

The Web page 300 can be a means by which a contact center agent interacts with a caller and/or the contact center. For example, Web page 300 can be displayed within the Web browser 212 of the agent desktop 210 of system 200. It should be noted that the machine code associated with the rendering and functionality of the Web page 300 can be written in accordance with accepted open standards in order to ensure compatibility with the components of an open contact center.

The Web page 300 can display a variety of information and actions made available to an agent by the open contact center for handling received calls. The information and actions can be presented as a multitude of selectable sections, allowing an agent to customize the Web page 300 for their preferred usage. In one embodiment, these sections can be implemented as dynamic portlets of a Web portal page. In another embodiment, the sections can be sections of a dynamic Web page, as opposed to being different portlets. Additionally, the content in the Web page 300 can be dynamically adapted based upon call or agent specific factors. For example, different views of page 300 can be displayed depending upon a level of agent authority (e.g., agent, certified agent, supervisor, and the like). In another example, views can change based upon an expertise needed for handling a call (e.g., different views for customer service calls, electronic sales calls, warranty calls, and the like).

Sections of the Web page 300 can include a session information section 305, a caller information section 310, an interface modes section 315, and an actions section 320. The session information section 305 can display information regarding the current communications session. Information displayed in this section 305 can be handled by the session server 230 and can be stored as session data 233 of system 200. In this example, the session information section 305 displays the time at which the current call was received by the contact center, the time at which the agent began servicing the call, the time that has elapsed while the agent is servicing the call, the time at which the agent concluded servicing the call, and an area in which the agent can enter textual information detailing how the call was resolved.

The caller information section 310 can display information regarding the caller of the current communication session. This information can be stored in a data store 232 as profile data 234 of system 200. Additionally, the automated response application 227 of system 200 can collect information from the caller that can be displayed within this section 310. In this example, the caller information section 310 contains the name, address, phone number, and account number of the caller associated with the current session.

The interface modes section 315 can present an agent with the available communication modalities supported by the open contact center for interacting with the caller. An agent can select the modality that is appropriate for the type of interaction required for the call. In this example, an agent can select a voice modality, a text exchange modality, and a Web modality. As used herein, a text exchange is defined as a real-time communication where text is conveyed between two parties. A text exchange can include chat communications, instant messaging communications, text messaging communications, and the like. A Web modality is defined as a real-time or near real-time communication between two parties utilizing HTTP. A Web modality can include streaming video, video conferencing, co-browsing, and the like.

It should be noted that the interface modality being used by the caller can be unaffected by the selection of a different interface modality by the agent. For example, an agent can opt to use a text exchange modality in addition to a voice modality, where the text exchange modality creates a dynamic "transcription" or a textual history of spoken content. The textual history can then be saved for later use, such as agent training, agent monitoring, and as log of an interaction with a caller. A composite services implementation of contact center functions can provide flexibility as to an interactive modality while ensuring consistent handling for different modal interfaces and while ensuring state information is maintained throughout a communication session even when an interface modality is changed during the communication session.

The actions section 320 can present an agent with operations available for execution within the open contact center system. In this example, the actions sections 320 contains operations for conducting a conference call with a third party, placing the call in a hold state, transferring the call to another agent or system component, and searching the knowledge-base (KB) of a contact center.

It should be noted that the information presented in the Web page 300 is not wholly accessible by the caller. For instance, the system can present a caller with a specific list of actions, such as to review and modify selected fields of the caller information section 310 which differ from those presented to an agent in the actions section 320. Agents with different authority levels (e.g., an apprentice agent, a certified agent, and a supervisor) can be presented with a Web page 300 having different information. This can be true even when multiple agents are conferenced into a common communication session (i.e., when a supervisor is monitoring a live communication session between an agent and a caller, the supervisor can be presented with additional information not available to the agent).

Figure 4:
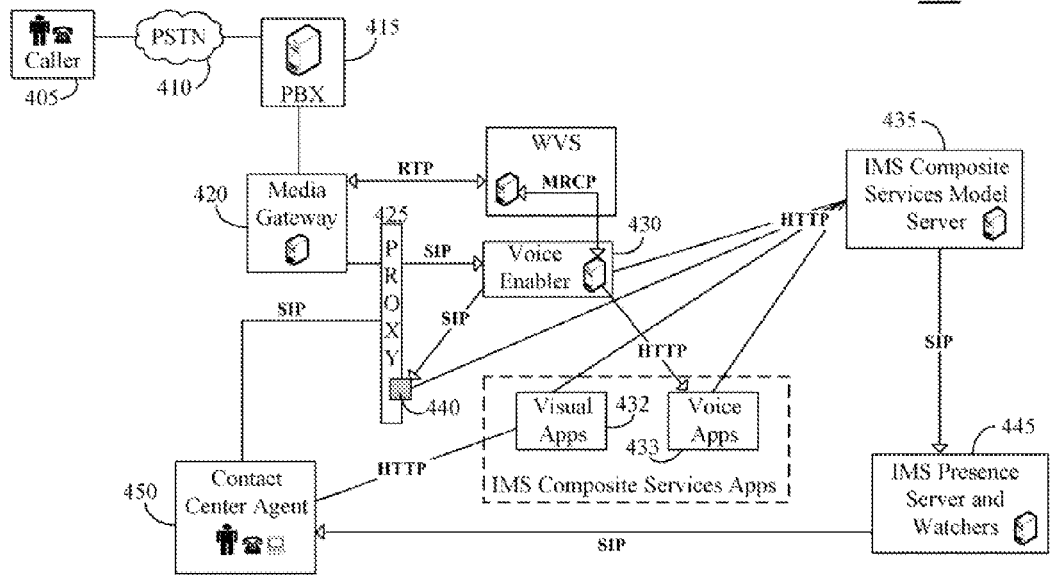
FIG. 4 is a schematic diagram of a system illustrating a standards based contact center that is implemented using IP Multimedia Subsystem (IMS) components and associated tooling in accordance with an embodiment of the inventive arrangements disclosed herein.

FIG. 4 is a schematic diagram of a system 400 illustrating a standards based contact center that is implemented using IP Multimedia Subsystem (IMS) components and associated tooling in accordance with an embodiment of the inventive arrangements disclose herein. System 400 represents one particular embodiment for system 200. It should be noted that communications between the components of system 400 are based on open standards, such as HTTP and SIP.

An illustrative scenario for system 400 can show how the components interact. In this scenario, a caller 405 can initiate a call over a standard telephone line utilizing PSTN 410 and PBX 415. The call can be receive by the center's media gateway 420 and passed through a SIP proxy 425 to a voice enabler 430.

The voice enabler 430 can launch a voice application 433 for the caller 405 to interact with. The voice enabler 430 can relay information collected by the voice application 433 to the model server 435 using HTTP. Once the caller 405 is finished entering information into the voice application 433, the voice enabler 430 can request that the SIP proxy 425 transfer the call to an agent.

The transfer element 440 of the SIP proxy 425 can then send a HTTP requires to the model server 435 for an agent to whom to transfer the call to. Using SIP, the model server 435 can relay the request for an agent to the presence server 445. The presence server 445 can determine an available agent compatible with the request and can convey the agent's information back to the model server 435 in a SIP communication. In turn, the model server 435 can provide the transfer element 440 with the agent information in a HTTP message.

Upon receipt of the agent information, the transfer element 440 can issue a SIP INVITE to the designated contact center agent 450. The contact center agent 450 can then initiate a visual application 432, such as Web page 300 of FIG. 3. The visual application 432 can obtain information from the model server 435 to present to the contact center agent 450.

Figure 5:
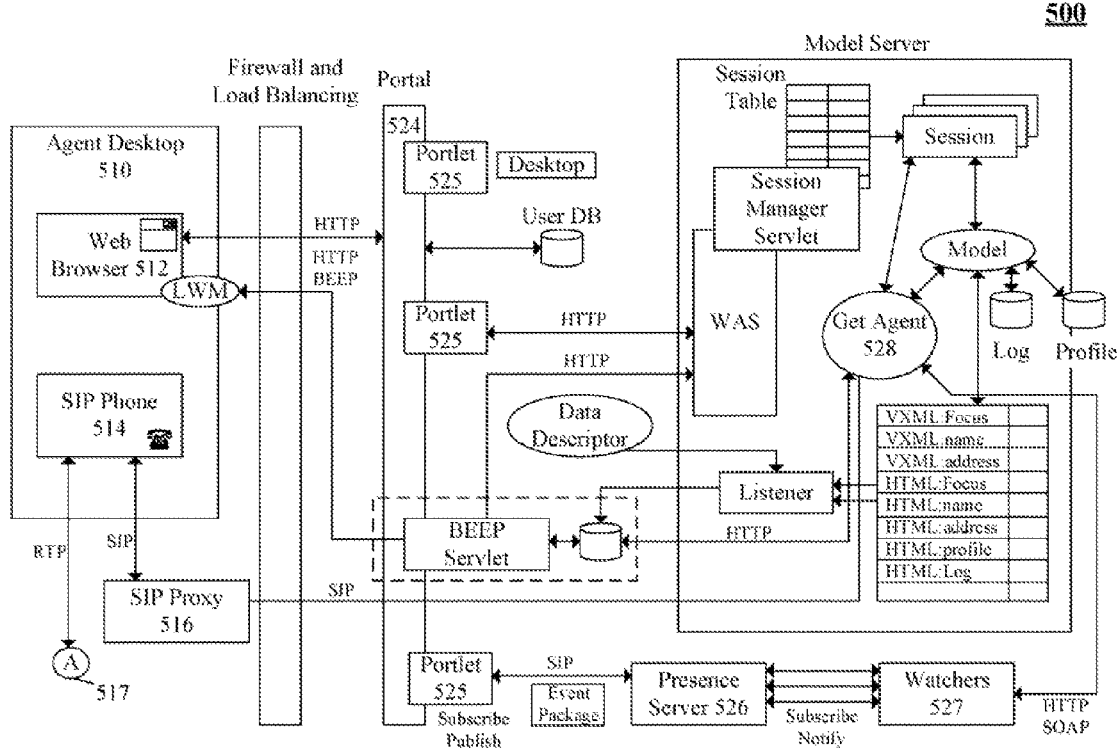
FIG. 5 is a schematic diagram of a standards based contact center from an agent perspective that is implemented using WEBSPHERE enabled components and associated tooling in accordance with an embodiment of the inventive arrangements disclosed herein

FIG. 5 is a schematic diagram of a standards based contact center 500 from an agent perspective that is implemented using WEBSPHERE enabled components and associated tooling in accordance with an embodiment of the inventive arrangements disclosed herein. Center 500 represents one particular embodiment for system 200. It should be noted that center 500 utilizes WEBSPHERE enabled components for illustrative purposes only and the scope of the invention is not to be construed as limited in this regard. Other middleware solutions and open standards based solutions can be substituted and adapted to achieve approximately equivalent results.

An illustrative scenario for center 500 can show how the components interact. In this scenario, a call can come in over a telephone to the contact center 500 using a standard telephone, where the call is transferred to an agent connected to contact center components using agent desktop 510. The agent can utilize any personal computer in an operations center as the agent desktop 510 and is not trained to a particular station. The agent can also remotely (i.e., external to an operations center, such as through a home computer) connect to contact center components using a Web browser 512 and SIP based telephone 514. The agent can sign onto portal 524 via an agent desktop portal 525. For example, the agent can enter a user id and password and hit a SUBMIT button.

The desktop agent portlet can call the WEBSPHERE PRESENCE SERVER (WPS) 526 with a publish/subscribe mechanism. An IP address of the agent's SIP phone 514, browser 512, Blocks Extensible Exchange Protocol (BEEP) address, and other information including agent expertise and agent utilization can be conveyed to the presence server 526. After login onto the system, a default screen can be presented in the browser 512 that indicates that the agent is active and available.

It should be emphasized that use of a LOTUS Lightweight Messaging (LWM) client and the BEEP protocol is just one contemplate technique for communicating with the agent desktop and that the invention is not to be limited in this regard. That is, any of a variety of other techniques can be substituted that provide approximately equivalent function to LWM and BEEP. For example, Asynchronous JavaScript and XML (AJAX) based clients using HTTP can establish communications with the agent desktop in one contemplated embodiment.

Watchers 527 can be plugged into the presence server 526 for items of interest to the contact center. One item of interest can be agent expertise and there can be a one-to-one correspondence between watchers 527 and expertise. When the agent logs onto the contact center 500, he/she registers with the presence server 526. The presence server 526 can update watcher 527 information so that those watchers associated with expertise(s) of the logged in agent are informed that a new agent having this expertise is available for receiving calls.

At this time, a call between a caller on a phone and the contact center 500 can be active. In a running Voice XML (VXML) application, the WEBSPHERE Voice Enabler (VE) can prompt a user for input. The VE can interact with the WEBSPHERE VOICE SERVER to determine user context information and a purpose of a call. The purpose of the call can be associated with an expertise category. The caller responses can indicate that agent assistance is needed. For example, a caller can select a dialog option to speak with a live agent.

The VXML application can transfer the caller to an agent transfer servlet co-located with the SIP proxy 516. For example, the get agent 528 function can be executed for a particular expertise, such as "expertise=1". A watcher 527 associated with expertise=1 can be contacted. A further filter (i.e., a load balancing filter) can be applied to the watcher 527 that filters based on usage criteria. For example, the least used agent can be granted priority by the load balancing filter. Other load balancing filters can be used and the invention is not to be construed as limited in this regard.

For instance, filters for selecting an agent having the needed expertise can utilize criteria of any complexity. Filtering criteria can include, but is not limited to, a length of time of an agent in a watcher list, a category of watcher (i.e., dedicated agent or independent knowledge broker), a customer satisfaction rating for interactions with the agent, a skill level in the expertise category of the agent, an estimated wait time for an agent based upon a current queue, and the like. Accordingly, contact centers can customize agent selection in numerous business specific manners to improve customer satisfaction, to decrease costs to a business, to minimize wait time, and/or to achieve other business objectives.

Once the transfer is made, the agent can receive the call using the SIP phone 514 and can receive caller specific data via the browser 512. The communication can include the SIP proxy 516 and/or a real time protocol (RTP) connection direct to the caller 517.

It should be noted that middleware programming interface of contact center 500 allows for custom services to be created for contact center operations. These services can be provided by the middleware provider and/or by third party providers, which include traditional vendors of contact center solutions. The presence server 526 subscription function permits the dynamic registration of agents and agent capabilities. Further, the rich presence function of the server 526 can permit real-time status metrics on agent operations. Generally, contact center 500 encourages the interoperation of services provided by different sources, which permits the contact center 500 to gracefully evolve and to use best practices and applications tailored to the specific needs of the business or organization for which the contact center 500 is implemented.

Further, the arrangements of contact center 500 permit knowledge brokering and independent agent services to be provided to a multitude of business entities. That is, agents can operate as independent knowledge brokers, who sell their knowledge and services in a manner analogous to how goods/merchandise is sold today. Thus, contact center 500 can connect people with knowledge to sell, such as doctors, lawyers, and other professionals, to those willing to pay for this knowledge (i.e., callers or communicators contacting the call center). Businesses can utilize these independent contractors to handle difficult problems that dedicated staff is unable to handle, to handle overflow to ensure that queue wait times remain under a configurable duration, and to offer an unprecedented level of contact center flexibility. The open standards based nature of center 500 permits the seamless integration of independent knowledge brokers and dedicated personnel in a fashion transparent to callers. In short, higher quality contact center services can be provided at less costs using center 500 than is possible using conventionally implemented contact centers.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A contact center system comprising:

a portal server for providing an agent portal through which a contact center agent utilizing the agent node communicates, wherein said agent portal includes a plurality of agent portlets within which contact center information is presented;

an application server executing contact center applications for receiving input for contact center applications from the agent portlets and to present contact center output through the agent portlets, wherein a caller is automatically transferred to the contact center agent by a contact center, wherein after the transfer session specific information is conveyed via the agent portal in at least one of real-time and near real-time, said application server utilizing a plurality of open standardized components to implement call center functionality;

at least one agent node comprising a standard Web browser, wherein the Web browser communicates over a standard Internet Protocol based network using standard communication protocols, said Web browser presenting an agent portal, said agent portal being an interface through which the agent utilizing an agent desktop communicates; and a plurality of agent views selectively presented in the standard Web browser, wherein different ones of the agent views are automatically selected and presented in the Web browser based upon at least one of an agent authority level of an agent using the agent node and an agent expertise required for handling a caller issue for which a caller has been transferred to the agent node, said agent portal including a plurality agent portlets within which contact center information presented, said plurality of portlets comprising:

a session portlet presenting session-specific information for a communication session between a contact center agent using the standard Web browser and a caller that was transferred to the contact center agent by a contact center system; and a caller portlet presenting caller-specific information, wherein the agent portal is used to communicate information in real-time between the contact center agent and the contact center system, wherein the caller is unable to view at least a portion of the information communicated between the contact center agent and the contact center system.

2. The contact center system of claim 1, further comprising:

a Web server for providing agent specific content to a contact center agent accessing a contact center through the agent node; and an application server executing contact center applications for receiving input for the contact center applications from the agent node and to present contact center output through the agent node, wherein a caller is automatically transferred to the contact center agent by a contact center, wherein after the transfer session specific information is conveyed via the agent node in at least one of real-time and near real-time, said application server utilizing a plurality of open standardized components that are IP Multimedia Subsystem composite services model components to implement call center functionality.

3. The contact center system of claim 1, wherein said agent node further comprises:

a Session Initiation Protocol (SIP) based phone through which voice-based communications between the contact center agent and the caller are conducted.

4. The contact center system of claim 3, wherein the SIP based phone and the Web browser are both commercial off-the-shelf components that are based upon open standards.

5. The contact center system of claim 1, wherein a caller is automatically transferred to the agent node by a contact center, wherein after the transfer session specific information is conveyed via the agent node in at least one of real-time and near real-time, and wherein the transfer is performed by a Voice eXtensible Markup Language (Voice XML) software application using a Voice XML transfer element.

6. The contact center system of claim 1, further comprising:

a presence server for determining agent availability and for providing a contact center with agent specific information including an identifier for the agent node, wherein the agent node is for conveying presence information to the presence server.

7. The contact center system of claim 1, wherein said at least one agent node comprises a plurality of agent nodes, each corresponding to a contact center agent, and each being used by the corresponding contact center agent to send information to a contact center, to receive information from the contact center, and to communicate in real time with callers, whom the call center transferred to the agent node.

8. The contact center system of claim 7, wherein the agent nodes communicate with callers using a plurality of different modalities, which include a voice modality, a text exchange modality, and a video modality.

9. A method of transferring a contact center communication to a contact center agent comprising:

a contact center agent logging onto a contact center system from a standard Web browser;

a presence server accepting presence information from the contact center agent;

a computer system executing a computer program product determining that a caller is to be transferred to a live agent;

a computer system executing a computer program product querying the presence server for an available agent;

a computer system executing a computer program product transferring the caller to the contact center agent based upon results of the querying step;

a computer system executing a computer program product determining one of a plurality of different agent views for the standard Web browser of the contact center agent, wherein different ones of the wherein different ones of the agent views are automatically selected and presented in the Web browser based upon at least one of an agent authority level of the contact center agent using the Web browser and an agent expertise required for handling a caller issue of the caller;

a portal server providing the agent portal to the standard Web browser;

an application server executing contact center applications for receiving input for the contact center applications from the provided agent portal and to present contact center output through the provided agent portal, wherein session specific information is conveyed via the agent portal in at least one of real time and near real time, said application server utilizing a plurality of open standardized components to implement call center functionality;

presenting within the standard Web browser the portal server provided agent portal, said agent portal being an interface through which the contact center agent utilizing an agent desktop communicates, said agent portal including a plurality of agent portlets within which contact center information is presented, said plurality of portlets comprising:

a session portlet presenting session-specific information for a communication session between a contact center agent using the standard Web browser and a caller that was transferred to the contact center agent by a contact center system; and a caller portlet presenting caller-specific information, wherein the agent portal is used to communicate information in real-time between the contact center agent and the contact center system, wherein the caller is unable to view at least a portion of the information communicated between the contact center agent and the contact center system.

10. The method of claim 9, wherein programmatic instructions included in a standardized markup document are read by a machine causing the machine to perform the determining, querying, and transferring steps.

11. The method of claim 10, wherein the standardized markup document is a Voice XML document interpreted by a voice server.

12. The method of claim 11, wherein the Voice XML document includes a Voice XML transfer element, and wherein the transferring step results from an execution of the Voice XML transfer element.

13. The method of claim 9, wherein the transferring step results in a real-time voice communication between the contact center agent and the caller, said contact center agent using a standard Session Initiation Protocol (SIP) based phone for the voice communications.

14. The method of claim 9, wherein the Web browser presents real-time information relating to a communication session between the caller and the agent, said real-time information comprising including, textual transcriptions of voice communications involving the caller.

15. The method of claim 9, wherein the presence server communicates using Session Initiation Protocol (SIP) based messages and in conformance with an Internet Engineering Task Force (IETF) based standard, and wherein the presence server provides operations for PUBLISH, SUBSCRIBE, and NOTIFY.

16. A contact center agent interface comprising:

a standard Web browser in which an agent portal is presented, said agent portal being an interface through which the agent utilizing the agent desktop communicates, said agent portal including a plurality of agent portlets within which contact center information is presented, said agent portal being served by a portal server, said portal server for providing the agent portal through which a contact center agent utilizing the agent node communicates, wherein input from the agent portal and input to the agent portal is handled by an application server, said application server executing contact center applications for receiving input for contact center applications from the agent portlets and to present contact center output through the agent portlets, wherein a caller is automatically transferred to the contact center agent by a contact center, wherein after the transfer session specific information is conveyed via the agent portal in at least one of real-time and near real-time, said application server utilizing a plurality of open standardized components to implement call center functionality, wherein a plurality of agent views are selectively presented in the standard Web browser, wherein different ones of the agent views are automatically selected and presented in the Web browser based upon at least one of an agent authority level of an agent using the Web browser and an agent expertise required for handling a caller issue for which a caller has been transferred, said plurality of portlets comprising:

a session portlet presenting session-specific information for a communication session between a contact center agent using the standard Web browser and a caller that was transferred to the contact center agent by a contact center system; and a caller portlet presenting caller-specific information, wherein the agent portal is used to communicate information in real-time between the contact center agent and the contact center system, wherein the caller is unable to view at least a portion of the information communicated between the contact center agent and the contact center system.

17. The contact center agent interface of claim 16, wherein said agent portal includes a plurality of agent selectable interface modes for communicating with the caller, wherein said interface modes include at least one voice mode and at least one text exchange mode.

18. The contact center agent interface of claim 16, further comprising:

a SIP based phone for permitting the contact center agent to communicate with the caller over a voice channel, wherein the SIP based phone and the Web browser are both commercial off-the-shelf equipment that conform to open standards, said open standards comprising a Hyper Text Transfer Protocol (HTTP) based standard and a Session Initiation Protocol (SIP) based standard.

* * * * *